(12) United States Patent
Berry et al.

(10) Patent No.: US 12,122,931 B2
(45) Date of Patent: Oct. 22, 2024

(54) METHOD FOR TREATING EXTERIOR LUMBER PRODUCTS

(71) Applicants: Michael Vance Berry, Johns Creek, GA (US); Steve Mills, Madison, AL (US); Michael Watson, Tuscumbia, AL (US)

(72) Inventors: Michael Vance Berry, Johns Creek, GA (US); Steve Mills, Madison, AL (US); Michael Watson, Tuscumbia, AL (US)

( * ) Notice: Subject to any disclaimer, the term of this patent is extended or adjusted under 35 U.S.C. 154(b) by 44 days.

(21) Appl. No.: 18/133,890

(22) Filed: Apr. 12, 2023

(65) Prior Publication Data

US 2023/0250308 A1    Aug. 10, 2023

Related U.S. Application Data

(63) Continuation-in-part of application No. 17/460,557, filed on Aug. 30, 2021, now Pat. No. 11,655,389, and a continuation of application No. 16/517,964, filed on Jul. 22, 2019, now abandoned.

(60) Provisional application No. 62/765,334, filed on Aug. 22, 2018.

(51) Int. Cl.
*C09D 15/00* (2006.01)
*B05D 7/08* (2006.01)

(52) U.S. Cl.
CPC ............... *C09D 15/00* (2013.01); *B05D 7/08* (2013.01)

(58) Field of Classification Search
CPC .................................. C09D 15/00; B05D 7/08
See application file for complete search history.

(56) References Cited

U.S. PATENT DOCUMENTS

| | | | | |
|---|---|---|---|---|
| 4,011,388 A | * | 3/1977 | Murphy | C08F 291/00 526/201 |
| 2016/0145457 A1 | * | 5/2016 | Grunewalder | C09D 175/16 427/372.2 |

* cited by examiner

*Primary Examiner* — Nathan T Leong
(74) *Attorney, Agent, or Firm* — Lanier Ford Shaver & Payne, PC; Gerald M. Walsh

(57) ABSTRACT

A method of treating a surface of wood products to inhibit the uptake of moisture into the wood by providing an aqueous formulation comprising polyethylene-vinyl acetate in water, 2-99 percent polyethylene-vinyl acetate by weight. The aqueous formulation is applied to the surface of wood products, wherein the wood products remain outdoors or in a damp environment having 60% or greater relative humidity. The aqueous formulation is allowed to dry and form a micro-film on the surface of the wood products. The moisture content in the wood products is maintained at 16 percent or less. A pesticide effect on the surface of the wood products is produced, inhibiting infestation of the wood products by insects.

20 Claims, 1 Drawing Sheet

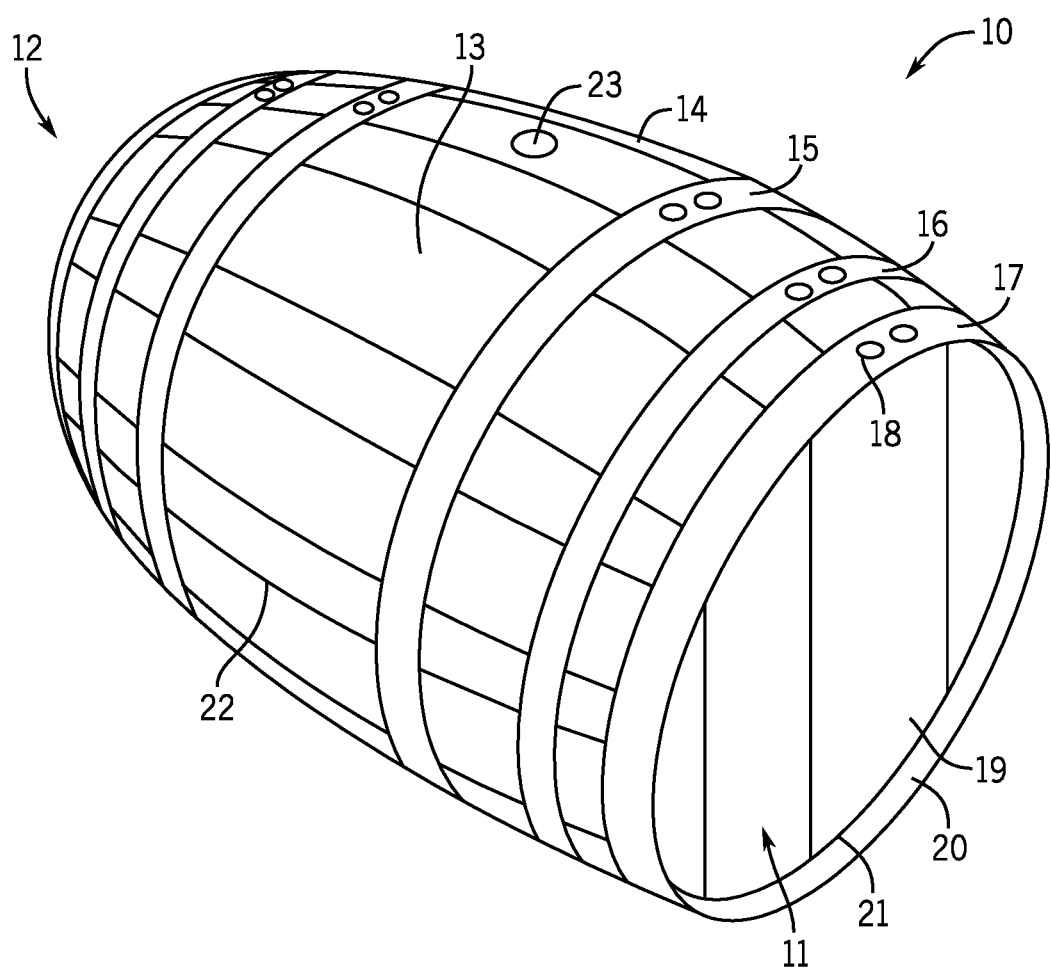

METHOD FOR TREATING EXTERIOR LUMBER PRODUCTS

CROSS REFERENCE TO RELATED APPLICATIONS

This application claims priority to earlier filed U.S. Nonprovisional patent application Ser. No. 17/460,557, filed Aug. 30, 2021, which claims the benefit of U.S. Nonprovisional patent application Ser. No. 16/517,964, filed on Jul. 22, 2019, which claims the benefit of U.S. Provisional Patent Application 62/765,334, filed on Aug. 22, 2018, the contents of which are herein incorporated by reference in their entirety.

FIELD OF THE INVENTION

This invention relates to methods for protecting wood products outdoors or in a damp environment from damage due to water and, more particularly, to methods of applying protective micro-films of polyethylene-vinyl acetate to surfaces of wooden products maintained outdoors or exposed to damp environments.

BACKGROUND OF THE INVENTION

When exposed to humidity, wood can absorb water moisture, and resulting differential expansion and contraction between portions of the boards can cause damage to the wood. Absorption of water into wood deteriorates and rots wood and accelerates growth of and damage by wood-destroying mold and fungus. Visqueen or polyethylene plastic sheets on the ground, poured concrete, pack-filled dirt, or other expensive methods fail to regulate moisture content in lumber structures. Failure to regulate moisture in wood weakens wood strength, causing subfloor warping and deflecting or sagging joists. Lumber structures outdoors, in damp environments, or associated with building foundations have been difficult to protect from moisture because they are exposed to dampness or extreme outdoor weather conditions.

It is known to apply an aqueous formulation of polyvinylidene chloride to a surface of wood, inside buildings, to form plastic films thereon to protect the wood from moisture inside the buildings (see U.S. Patent Application No. 20160145457). However, these formulations have not been useful outside of buildings to adequately protect wood from moisture, for example, on wood fences, roof shingles, siding, and in crawl spaces of building foundations because the plastic films formed by these formulations are not sufficiently durable outside of buildings, in damp environments, or during exposure to extreme weather conditions. In addition, polyvinyl chlorides and polyvinylidene chloride form dioxins when combusted, for example, in accidental fires or during disposal by incineration. Dioxins are potent carcinogens, and it is preferable not to use chloride containing plastic polymers on wood products.

Application of a liquid spray that forms a plastic film of strong bonding strength on the surface of exterior wood, outside of a building or in a damp environment, providing strong durability and a strong barrier to absorption of moisture, and not producing toxic byproducts, such as dioxins, would provide an improvement over existing methods for preventing moisture damage to wood products exposed to damp or outdoor weather conditions.

SUMMARY OF THE INVENTION

This invention provides a method of treating a surface of wood to inhibit the uptake of moisture into the wood. The method includes providing an aqueous formulation comprising one or more non-chloride, film forming, long-chain polymers in water at 2-99 weight percent, spraying the aqueous formulation on the surface of the wood, and allowing the aqueous formulation to dry and form a micro-film on the surface of the wood. The one or more long-chain polymer is, preferably, polyethylene-vinyl acetate. The wood can be exterior wood outdoors (outside of a building or shelter) and may include wood products such as fences, shingles, and siding, and floor framing systems having joists, subflooring, and girder beams in crawl spaces. The wood can also be spirit barrels which need to be maintained in a damp environment. The micro-film contains no detectable volatile organic compounds. A clear coloring agent may be added to the aqueous formulation and the micro-film may remain clear so that the surface of the wood is visible through the film for inspection. An antimicrobial may be added to the aqueous formulation to stabilize and preserve the micro-film. The micro-film maintains the moisture content in the wood at 16 percent or less.

An advantage of the present invention is that it provides a simple, rapid, and relatively easy method of inhibiting moisture damage to wood products.

Another advantage is a colored micro-film that is clear and allows for continued inspection of a wood surface.

Another advantage is that the micro-film does not rub off, get diluted with water, or become damaged by workers and pets who may come into contact with micro-film treated wood.

Another advantage is a micro-film that has a water vapor permeation rate of only 0.48 g per $m^2$ per day compared to 5 g for polyvinyl chloride and 1 g for polyvinylidene chloride.

Another advantage is a micro-film that protects wood exposed to dampness or extreme weather conditions.

BRIEF DESCRIPTION OF THE DRAWING

FIG. 1 shows a front, side, perspective view of a spirit barrel.

DETAILED DESCRIPTION OF THE INVENTION

While the following description details the preferred embodiments of the present invention, it is to be understood that the invention is not limited in its application to the details of arrangement of the parts or steps of the methods disclosed herein, since the invention is capable of other embodiments and of being practiced in various ways.

This invention provides a method of treating the surface of wood by applying a micro-film to the surface of wood products such as fences, singles, and siding, wood in crawl spaces of the foundations of buildings, and spirit barrels which are required to be maintained in a damp environment. The method produces protection of the wood from damage caused by moisture and provides an easy and quick way of protecting wood in spaces that are difficult to reach or access in crawl spaces of building foundations. The sealant is a long-chain waterborne polymer wax, polymer oil sealant, or a polymer adhesive that protects the entire floor framing system including joists, subflooring, girder beams, sill plate and rim band. The micro-film automatically controls the correct moisture balance for wood to achieve strength, resist environmental issues, and control warp, deflection, deterioration and rot of joists and subfloor materials that make up a building's structural floor and wall framing systems.

Wood is a porous and fibrous structural tissue found in the trunks, stems and roots of trees and other woody plants. It is an organic material, a natural composite of cellulose fibers that are strong in tension and embedded in a matrix of lignin that resists compression. Wood includes, for example, hardwood and softwood lumber directly cut from trees, as well as engineered wood composites made from strands, particles, fibers or veneers of wood. Examples of wood composites include, but are not limited to, plywood, oriented strand board (OSB), medium-density fiberboard (MDF), particle boards, and the like. Exemplary woods include hardwood species such as ash, alder, birch, cherry, mahogany, maple, oak, poplar, teak, hickory and walnut, and softwood species such as cedar, fir, pine and redwood. The wood can be cut or formed into a wide variety of shapes for use as a structural or a building material, or for fences, shingles, and siding and other outdoor wood products.

An aqueous formulation of one or more film forming, non-volatile, non-chloride containing, long-chain polymers may be produced by methods well known in art. The aqueous film forming formulation preferably includes from about 2 to 99 percent by weight (wt %) of the non-chloride containing long-chain polymer component in water, based on the total weight of the aqueous film forming formulation. A preferred non-chloride-containing long-chain polymer is polyethylene vinyl acetate (PEVA). Another preferred non-chloride containing long-chain polymer is polyurethane. These non-chloride-containing long-chain polymers can be used individually or in combination in the aqueous formulation. In combination in the aqueous formulation, preferably, PEVA is 60-70 wt % and polyurethane are 20-26 wt %.

Typical performance enhancing additives may be added as desired to the aqueous formulation such as surface-active agents, pigments, colorants, dyes, surfactants, dispersants, defoamers, thickeners, heat stabilizers, leveling agents, coalescents, biocides, mildewcides, anti-cratering agents, curing indicators, plasticizers, fillers, sedimentation inhibitors, ultraviolet light absorbers, optical brighteners, and the like at about less than 5 wt % of the total formulation.

A film stabilizer, preservative, and antimicrobial, such as zinc oxide, zinc borate, copper salts, or disodium tetraborate can be added to the aqueous formulation. Zinc oxide suppresses bacterial and mold growth in the micro-film and keeps the aqueous formulation stable when the aqueous formulation is sprayed and contacts the surface of wood. These stabilizing agents are added to the aqueous formulation up to 2 wt %.

A colorant or dye may be added to the aqueous formulation to color the wood surface in any desired color for identification and certification of application. The micro-film produced by the aqueous formulation may be clear and the colorant or dye may be clear so that the surface of the wood remains visible through the micro-film allowing termite inspection. A preferred clear colorant is Permelon Orange obtained from Standard Colors, High Point, North Carolina. The colorant or dye is added to the aqueous formulation up to 2 wt %.

The aqueous formulation described above can be applied on the surface of wood using any suitable procedure such as brush coating, spray coating, roll coating, curtain coating, vacuum coating fan, sock coating and the like. Spraying is a preferred application method.

If desired, the surface of the wood may be cleaned and prepared for application of the disclosed aqueous formulation using methods well known in the art. The coating composition may be applied in one or more layers, with each layer preferably being applied in an amount sufficient to provide complete coverage and a continuous coating. However, one coat is preferred at a wet coating thicknesses of about 1 to 5 mils (about 0.03 mm to about 0.1 mm). The wet coating is allowed to dry and form a micro-film that is non-toxic and without any detectable volatile organic compounds. The micro-film does not rub off, or get diluted with water, or become damaged by workers and pets who may come into contact with the micro-film.

The effectiveness of the aqueous film forming formulation of this invention can be tested using a FLIR MR 160 Imaging Moisture Meter (https://www.flir.com/instruments/moisture-restoration). Typically, readings of more than 16% moisture content (absorption), season after season, can weaken structural lumber, leading to deterioration, infestation of wood destroying organisms, and interior damage costing tens of thousands of dollars to repair. Actual moisture content meter readings show that common Visqueen or polyethylene plastic on the ground, poured concrete and pack-filled dirt or other expensive methods show failure to regulate moisture content adequately, causing weaker wood strength, subfloor warping and deflecting or sagging joists.

To demonstrate the effectiveness of the aqueous film forming formulation of this invention, the formulation was sprayed on a surface of wood in a crawl space. The moisture content of the wood before applying the aqueous film forming formulation was measured with a FLIR meter and was 19.3%. 72 hours after applying the aqueous film forming formulation the moisture content of the wood was again measured and was reduced to 11.1%.

The aqueous film forming formulation of this invention can also be applied to the surface of wood products used outdoors such as fence boards, shingles, and siding, including cement fiber siding, and to the surfaces of spirit (i.e., wine, whisky) barrels which are maintained in a damp environment. A damp environment is defined as 60% to 80% relative humidity (www.corriganhumidity.com/wine-room/#:~:text=Experts%20agree%20that%2050%25%20RH).

The aqueous film forming formulation can be applied to these wood products by the methods disclosed herein. A matting agent, for example silica matting agents, may be added to the aqueous film forming formulation to reduce surface gloss. An alcohol liquid dye, preferably, may be added to the aqueous film forming formulation to produce a desired color on the surface of the wood. The micro-film on the surface of the wood products produces a pesticide effect, inhibiting infestation by insects, such as termites and the like.

FIG. 1 shows an example of a spirit barrel 10. The spirits barrel 10 has a top end 11 and a bottom end 12 and is formed with a plurality of barrel staves 13. Barrel staves 13 are narrow slats of wood with beveled edges which fit together forming joints to create a leak-resistant vessel for aging spirits. A barrel bilge 14 is the center bulge, or widest diameter of the spirits barrel 10. A barrel bilge hoop 15 is a metal band located near the center of the barrel, holding the barrel staves 13 together at the widest part of the spirits barrel 10. A barrel head hoop 16 is metal band located closest to the top 11 and the bottom 12 of the spirits barrel. A barrel quarter hoop 17 is a metal band located between the head hoop 17 and the bilge hoop 16. Rivets 18 are metal fasteners that hold the hoops together with force by attachment from hoop beginning to end. barrel head 19 is a barrel lid which fits snugly into the top 11 and bottom 12 of the spirits barrel 10, thereby sealing the barrel 10 for aging of spirits. A barrel chime 20 is a beveled edge for connecting bourbon barrel staves 13, thereby holding the barrel heads 19 in place. A barrel croze 21 is a small groove carved at both ends of a stave 13 into which the head 19 fits. A barrel stave joint 22 is a tongue-and-groove type joint which interconnects barrel staves 13 along their longest sides, forming a water-tight connection. These joints 22 remain flexible yet self-seal. A barrel bunghole 23 is a two-inch hole by which a spirits barrel 10 is filled and emptied. It is sealed with a bung which is a wooden puck that fits tightly into the bunghole 23.

The aqueous film forming formulation can be applied to the surfaces of spirits barrels by the methods disclosed herein. The formulation will penetrate and form a micro-film on the surfaces of the wood portions and will also form a film on the metal portions. The micro-film coating will preserve the spirits barrel and will seal the stave joints, barrel chime, and barrel croze. The micro-film coating will inhibit leaching of the contents from the spirits barrel, will inhibit drying of the spirits barrel, and inhibit evaporation of water and alcohol 10%-20% from the spirits barrel. The micro-film will also prevent rusting of the metal parts of the spirits barrel and inhibit infestation of insects such as the lead cable borer beetle.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, The aqueous film forming formulation may be applied to any wood surface in any location. Any type of liquid tint, powder pigment, or other additive clear coloring materials may be used to achieve any desired color of the resulting micro-film formed on the wood surface.

It will be understood that various changes in the details of the method and materials which have been described and illustrated above in order to explain the nature of this invention may be made by those skilled in the art without departing from the principle and scope of the invention as recited in the following claims.

We claim:

1. A method of treating a surface of wood to inhibit the uptake of moisture into the wood, the method comprising:
   1) providing an aqueous formulation comprising polyethylene-vinyl acetate in water, 2-99 percent polyethylene-vinyl acetate by weight;
   2) applying the aqueous formulation to the surface of one or more wood products, wherein the wood products remain outdoors or in a damp environment having 60% or greater relative humidity; and
   3) allowing the aqueous formulation to dry and form a micro-film on the surface of the wood products.

2. The method of claim 1 wherein the micro-film contains no detectable volatile organic compounds.

3. The method of claim 1, wherein the aqueous formulation has an alcohol liquid dye up to 2 percent by weight.

4. The method of claim 1, wherein the aqueous formulation has an antimicrobial up to 2 percent by weight.

5. The method of claim 1, wherein the aqueous formulation has a matting agent.

6. The method of claim 1, further comprising maintaining the moisture content in the wood products at 16 percent or less.

7. The method of claim 1, further comprising producing a pesticide effect on the surface of the wood products and inhibiting infestation of the wood products by insects.

8. The method of claim 1 wherein the wood product is a spirits barrel.

9. The method of claim 8, further comprising sealing barrel stave joints, a barrel chime, and a barrel croze of the spirits barrel with the micro-film.

10. The method of claim 8, further comprising inhibiting evaporation of water and alcohol from the spirits barrel by 10%-20%.

11. The method of claim 8, further comprising inhibiting infestation of the spirits barrel by insects.

12. A method of treating a surface of wood to inhibit the uptake of moisture into the wood, the method comprising:
    1) providing an aqueous formulation comprising polyethylene-vinyl acetate in water, 2-99 percent polyethylene-vinyl acetate by weight;
    2) applying the aqueous formulation to the surface of one or more wood products, wherein the wood products remain outdoors or in a damp environment having 60% or greater relative humidity;
    3) allowing the aqueous formulation to dry and form a micro-film on the surface of the wood products;
    4) maintaining the moisture content in the wood at 16 percent or less; and
    5) producing a pesticide effect on the surface of the wood products and inhibiting infestation of the wood products by insects.

13. The method of claim 12 wherein the micro-film contains no detectable volatile organic compounds, wherein the aqueous formulation has an alcohol liquid dye up to 2 percent by weight, wherein the aqueous formulation has an antimicrobial up to 2 percent by weight, and wherein the aqueous formulation has a matting agent.

14. A method of treating a surface of wood to inhibit the uptake of moisture into the wood, the method comprising:
    1) providing an aqueous formulation comprising polyethylene-vinyl acetate in water, 2-99 percent polyethylene-vinyl acetate by weight;
    2) applying the aqueous formulation to the surface of a wood product, wherein the wood product is a spirits barrel maintained in a damp environment having 60% or greater relative humidity;
    3) allowing the aqueous formulation to dry and form a micro-film on the surface of the of the spirits barrel; and
    4) sealing barrel stave joints, a barrel chime, and a barrel croze of the spirits barrel with the micro-film.

15. The method of claim 14, further comprising inhibiting evaporation of water and alcohol from the spirits barrel by 10%-20%.

16. The method of claim 14, further comprising inhibiting infestation of the spirits barrel by insects.

17. The method of claim 14 wherein the micro-film contains no detectable volatile organic compounds.

18. The method of claim 14, wherein the aqueous formulation has an alcohol liquid dye up to 2 percent by weight.

19. The method of claim 14, wherein the aqueous formulation has an antimicrobial up to 2 percent by weight.

20. The method of claim 14, wherein the aqueous formulation has a matting agent.

* * * * *